(12) United States Patent
Kalinadhabhotla et al.

(10) Patent No.: US 8,954,230 B2
(45) Date of Patent: Feb. 10, 2015

(54) METHOD AND SYSTEM FOR DETERMINING THAT A USER HAS OPERATED A VEHICLE IGNITION SWITCH

(71) Applicant: HTI IP, LLC, Atlanta, GA (US)

(72) Inventors: Deep Kalinadhabhotla, Atlanta, GA (US); Ivan Neflali Cardenas Perez, San Diego, CA (US); Bruce Lighter, La Jolia, CA (US)

(73) Assignee: HTI IP, LLC, Atlanta, GA (US)

( * ) Notice: Subject to any disclaimer, the term of this patent is extended or adjusted under 35 U.S.C. 154(b) by 0 days.

(21) Appl. No.: 14/185,817

(22) Filed: Feb. 20, 2014

(65) Prior Publication Data

US 2014/0172190 A1    Jun. 19, 2014

Related U.S. Application Data

(62) Division of application No. 12/859,149, filed on Aug. 18, 2010, now Pat. No. 8,682,525.

(60) Provisional application No. 61/234,746, filed on Aug. 18, 2009.

(51) Int. Cl.
*G06F 7/00* (2006.01)
*H04B 1/00* (2006.01)
*B60C 23/00* (2006.01)
*G07C 5/00* (2006.01)
*B60R 16/02* (2006.01)

(52) U.S. Cl.
CPC *G07C 5/008* (2013.01); *G06F 7/00* (2013.01); *B60R 16/02* (2013.01)
USPC ................. 701/36; 455/68; 340/442

(58) Field of Classification Search
USPC .......... 701/36; 455/68; 340/442, 990, 539.13; 709/219, 216, 218, FOR. 122; 702/182–185, 188
See application file for complete search history.

(56) References Cited

U.S. PATENT DOCUMENTS

| | | | |
|---|---|---|---|
| 2005/0139004 A1* | 6/2005 | Lee et al. | 73/488 |
| 2008/0071882 A1* | 3/2008 | Hering et al. | 709/217 |
| 2010/0120373 A1* | 5/2010 | Wheatley et al. | 455/68 |

* cited by examiner

*Primary Examiner* — Muhammad Shafi

(57) ABSTRACT

In telematics device mounted to a vehicle, an auxiliary processor detects an interrupt from an accelerometer and forwards the interrupt to a main processor—the interrupt wakes up the processor from a sleep mode. The main processor may then compare vehicle voltage and/or a value for a speed parameter to predetermined criteria to determine whether the interrupt was a false positive or if the accelerometer missed a detection of a user cranking up the vehicle. The main processor may also enter a conditional state if monitored information meets a minimum threshold. During the conditional state, the processor may operate according to rules for a current operational state and also according to rules for a changed state. The threshold for deeming a changed operational state is higher than for entering a conditional state to evaluate whether a change of operational state (i.e., on to off, or off to on) occurred.

15 Claims, 7 Drawing Sheets

METHOD AND SYSTEM FOR DETERMINING
THAT A USER HAS OPERATED A VEHICLE
IGNITION SWITCH

CROSS REFERENCE TO RELATED APPLICATIONS

This application is as divisional of, and claims priority under 35 USC sec. 121 to, U.S. patent application Ser. No. 12/859,149 entitled "Method and system for determining that a user has operated an ignition switch" and having a filing date of Aug. 18, 2010, which claims priority under 35 USC sec, 119 to U.S. Provisional Patent Applications 61/234,746 having a filing date of Aug. 18, 2009, both of which this application incorporates herein by reference in their entireties.

FIELD

The invention relates to power management of a vehicle device, and more particularly to determining that an operator has operated the vehicle's ignition switch.

BACKGROUND

Telematics devices facilitate connecting a vehicle with a communications network. A telematices control unit ("TCU") installed in a vehicle typically comprises a global positioning satellite ("GPS") circuit, or module, wireless communication circuitry, including long range wireless (cellular telephony and data services) and short range wireless ("BlueTooth") capabilities. A TCU typically includes at least one processor that controls, operates, and manages the circuitry and software running thereon, and also facilitates interfacing with a vehicle data bus.

For example, a TCU installed by a vehicle's original equipment manufacturer ("OEM") such as Ford, Toyota, BMW, Mercedes Benz, etc., typically couples directly to the corresponding vehicle's data bus, such as, for example, a controller area network ("CAN") bus, an international standards is organization ("ISO") bus, a Society of Automotive Engineers ("SAE") bus, etc. The TCU can process and communicate information retrieved from the bus via links of the wireless communication networks, to a users mobile device local to the vehicle, or a computer device remote from the vehicle. In addition, the TCU can receive and process messages sent from a mobile device or a remote computer server that initiate and action by the vehicle, such as unlock a door, retrieve and send diagnostic information, and other functions known in the art.

In a scenario where an OEM has installed a TCU in its vehicle, the OEM may configure a TCU to receive, transmit, and process various proprietary codes known only to the OEM. An example of such a code may be a code that indicates that a user of the vehicle has operated an ignition key, or other devices, such as a push button, a key fob, a biometric device, etc. that either starts or stops a vehicle's engine, motor, or other power source. When a TCU installed by an OEM in its vehicle receives a code that a user has operated an ignition device to turn off the vehicle, the TCU typically enters a sleep mode to reduce energy usage while the vehicle is not operating. When a user cranks up, starts, or otherwise operates an ignition device, the OEM TCU may receive a code that a user placed the ignition device into run mode, and a code received by the TCU instructs it to leave the sleep state and 'wake up.' Typically sleep and awake modes relate to the state of processors, and other components that tend to use power.

SUMMARY

Some vehicles do not include a TCU installed by the vehicle's OEM. However, operators of these vehicles nevertheless desire advantages and services that a telematics device can facilitate. Aftermarket TCU devices typically couple to a vehicle via its diagnostic port, such as, for example, an OBD or OBD-II port. Although a diagnostic port provides access to many of a vehicle's proprietary codes, such as diagnostic trouble code ("DTC"), an OEM may wish to maintain the proprietary nature of many of the codes that a device could otherwise use to control aspects and operation of a given vehicle. In many situations, an OEM may not provide an aftermarket TCU with access to codes that indicate that an operator of a vehicle has operated an ignition switch, or other device, from, or to, a run state. Or, some aftermarket devices may be designed to operate without coupling to a diagnostic port.

An aftermarket TCU device that includes accelerometers, runs a computer program that processes the steps of a method for detecting that an operator has operated the ignition device. In an aspect, the method may detect vibration from the accelerometers and, through a series of decision steps, determine that the vibrations indicate that a vehicle has been placed in a run mode, rather than indicate that the vibrations are from an external force, such as, for example, wind, a door slam of another vehicle parked nearby, or a pedestrian bumping into the vehicle.

In another aspect, the method running on the TCU may evaluate the vehicle's battery voltage to determine that the vehicle has been placed in run mode and that the vehicle is in fact running. The method evaluates battery voltage and may determine that although a battery's nominal voltage is 12 volts, if the voltage across the poles of the vehicle's battery drops below 12 volts and then rises to a level above 12 V, the vehicle's engine is running and thus the aftermarket TCU should 'wake up.'

In another aspect, periodic evaluation of a vehicle's speed or acceleration may trigger a conditional key off state of the TCU and its main processor for a conditional period, after which the processor determines whether in fact the ignition switch was turned off by evaluating measured information against a set of key off data (speed, acceleration, battery voltage, for example) to determine that the vehicle is no longer running. If the vehicle is still running after the conditional period, the processor may perform actions according to one set of instruction, and if the vehicle has indeed been turned off, the TCU processor may perform actions according to a second set of instructions. The processor may also awaken upon the occurrence of a set of conditional signal values, and then evaluate after a conditional period whether to perform certain actions.

DETAILED DESCRIPTION

As a preliminary matter, it will be readily understood by those persons skilled in the art that the present aspects are susceptible of broad utility and application. Many methods, embodiments, aspects, and adaptations other than those herein described, as well as many variations, modifications, and equivalent arrangements, will be apparent from or reasonably suggested without departing from the substance or scope described herein.

Accordingly, while a detailed description in relation to preferred embodiments has been given, it is to be understood that this disclosure is only illustrative and exemplary and is made merely for the purposes of providing a full and enabling disclosure. The following disclosure is not intended nor is to be construed to limit or to exclude other embodiments, adaptations, variations, modifications and equivalent arrangements, the present invention being limited only by the claims appended hereto and the equivalents thereof.

Figure 1:
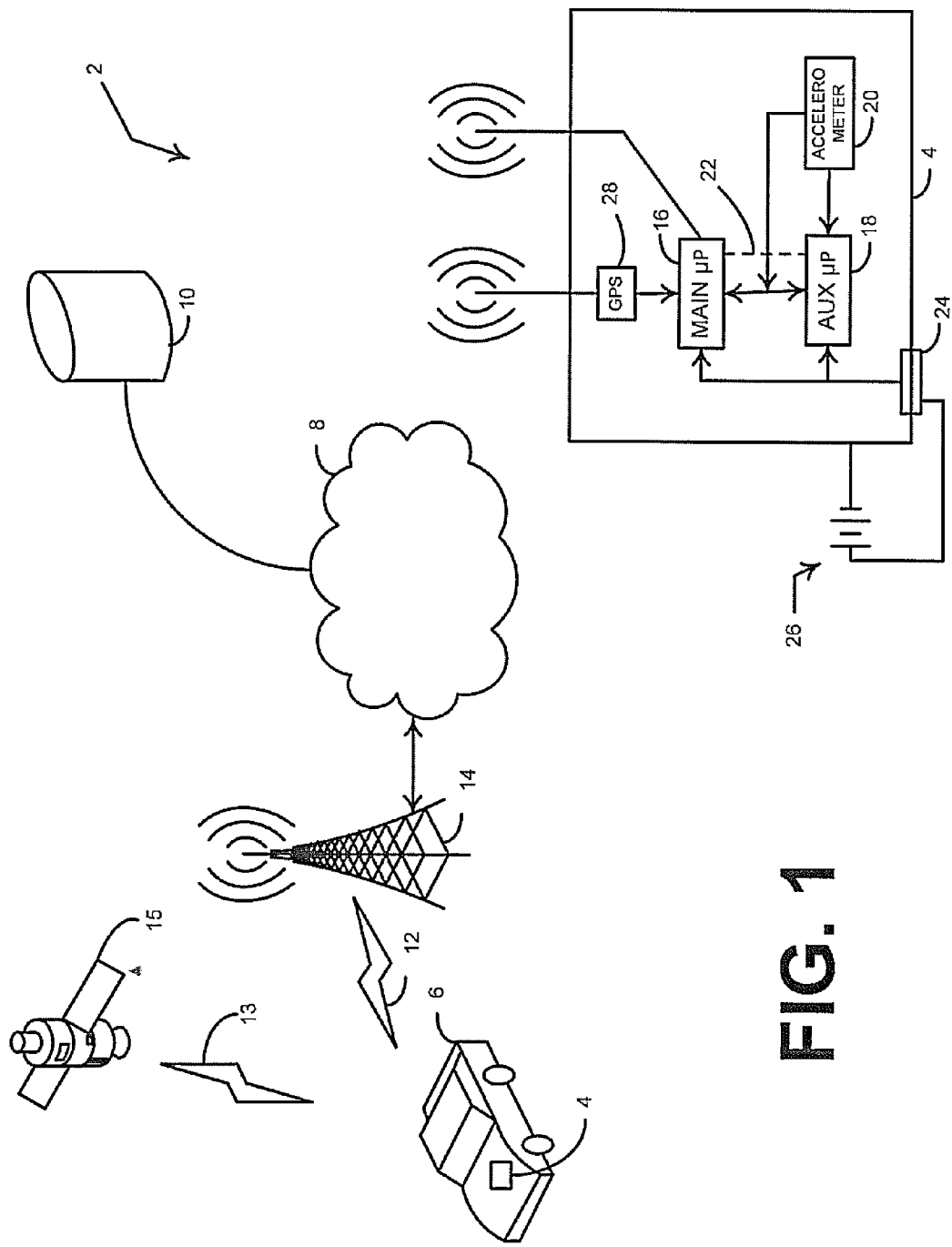
FIG. 1 illustrates a system for providing telematics services to a vehicle.

FIG. 1 illustrates a system 2 for providing telematics services. A telematics control unit ("TCU") 4 located in vehicle 6 uses communications components to communicate over communication network 8 with a telematics services provider's telematics operations center ("TOC") 10. TCU 4 communicates over wireless links 12 and 13 with wireless tower 14 and satellite 15, respectively. Tower 14 is typically coupled to communications network 8. Link 12 and tower 14 may be cellular, GPRS, wi-fi, Bluetooth, or other similar wireless communication systems and protocols. Link 13 and satellite 15 may be part of a global positioning satellite ("GPS") system.

TCU 4 includes various intercoupled electronic and electrical components. TCU 4 typically includes a main processor 16 that may execute instructions and perform actions and operations such as voice compression, video processing, application processing, and overall management of the TCU. Auxiliary processor 18 (less capability than main processor 16) may perform rudimentary functions but is generally stays in an 'awake,' albeit sometimes a low power, state. When it receives an interrupt, such as, for example, upon the occurrence of one or more conditions that meet(s) corresponding predetermined criteria, it may forward them to the main processor 16. For example, if main processor 16 is currently in a low power 'sleep mode' and accelerometer component 20 sends an interrupt, or message signal, to auxiliary processor 18 that acceleration experienced by the accelerometer exceeds a predetermined magnitude, or value, the auxiliary processor forwards the interrupt as a wakeup command the main processor over control line 22, which may connect to the main processor's wakeup interrupt pin. Thus, if a user cranks up the engine of vehicle 6, the accelerometers 20 would detect vibration from the engine and cause the main processor to 'wake 'up.' Main processor 16 may also monitor input signals from diagnostic port 24, such as, for example, an OBD, or OBD-II port, or a port used with other diagnostic protocols such as SAE J-1708, J1587, and J1939. Information from diagnostic port 24 may be used by main processor 16 to determine whether auxiliary processor 18 generated a false positive wakeup signal. In addition, auxiliary processor 18 monitors voltage of vehicle's 6 battery 26. TCU 4 typically monitors voltage of battery 26 through port 24. In addition, battery 26 typically provides power to components of TCU 4 through port 24—the battery typically supplies power to vehicle 6 as well as TCU 4.

Thus, after receiving a signal from accelerometer 20 that indicates force above a predetermined trigger threshold acted on vehicle 6, auxiliary processor 18 can evaluate the voltage of battery 26 to confirm that the engine in vehicle 6 is running. Typically, for a vehicle with only an internal combustion engine for motivation, the engine drives an alternator when it runs that generates a higher voltage than the battery's open circuit voltage. If auxiliary processor 18 receives an acceleration trigger signal from accelerometers 20 (typically a three-axis accelerometer integrated circuit device), the auxiliary processor may check the voltage of battery 26. If the voltage is higher than a nominal open circuit value, for example, 12.6 volts for a 12 volt battery, it determines that the engine of vehicle 6 is running and generates and sends to processor 16 a wakeup message.

If vehicle 6 is a hybrid vehicle, or an electric vehicle, the operator/driver thereof may operate the ignition device to an 'on' or 'run' position, but the vehicle may not generate significant vibration, or force, to cause accelerometers 20 to send an acceleration signal to auxiliary processor 18. However, the trigger threshold for comparing to an acceleration signal from accelerometers 20 may be set low enough to detect vibration of a user in the vehicle.

Typically, a TCU 4 is manufactured with a default trigger threshold setting. The TCU's maker may select the threshold based on use in an internal combustion powered vehicle. However, processor 16 also monitors signal values for diagnostic information parameters present at port 24, parameters such as, for example engine speed and vehicle speed. If after auxiliary processor 18 forwards an acceleration signal, or interrupt, to main processor 16 from accelerometer 20, the main processor may adjust (reduce) the trigger threshold value that accelerometer 20 uses to compare to acceleration signal values. Main processor 16 may make this adjustment if it determines that a current speed parameter value indicates the vehicle motor, or engine, is currently running or the vehicle is moving when the auxiliary processor 18 received the acceleration trigger signal. This scenario is deemed as a missed detection of a 'key-on' condition. For purposes of discussion, and the claims below, the acceleration signal received at auxiliary processor 18 may be referred to as a wakeup command. Accelerometer 20 typically compares signals generated by its internal mechanisms to a predetermined threshold set inside it based on a command from main processor 16. Auxiliary processor 18 receives the wakeup command and forwards it to an interrupt pin of main processor 16.

In addition to monitoring and evaluating information present at diagnostic port 24, main processor 16 may also monitor and evaluate information from GPS module 28 to determine whether vehicle 6 is moving, and increase the trigger threshold if it is not.

Also, instead of monitoring and evaluating information present at port 24 or from GPS module 28, main processor may request a message from auxiliary processor 18 regarding the voltage of vehicle's 6 battery 26. If the battery voltage is not within a predetermined range of a nominal run voltage of, for example, 13.6V—when an alternator runs, it typically produces power at between 13.5 and 14V for a 12V vehicle electrical system, the main processor may deem that the wakeup command corresponding to the voltage reading was a result of a false positive. These voltage levels may be different if vehicle 6 uses, for example, a 24V system.

Another scenario is a false positive key-on condition that can occur when accelerometer 20 senses acceleration due to, for examples, a door slam of a car parked near to vehicle 6, movement of a deck floor in a parking deck, wind blowing on the vehicle, someone bumping into the vehicle etc. If auxiliary processor 18 receives an acceleration signal and forwards it as a wakeup command to main processor 16, the main processor then may evaluate information present at diagnostic port 24. If vehicle's 6 onboard computer system is not updating information at diagnostic port 24, i.e., the diagnostic port does not respond to requests for information from main processor 16, or if speed parameter information indicates that the vehicle's engine is not running or the vehicle is not moving, the main processor may determine that the trigger threshold is too low and adjust (increase) the trigger threshold that accelerometer 20 uses to determine whether to generate a wakeup command.

Figure 2:
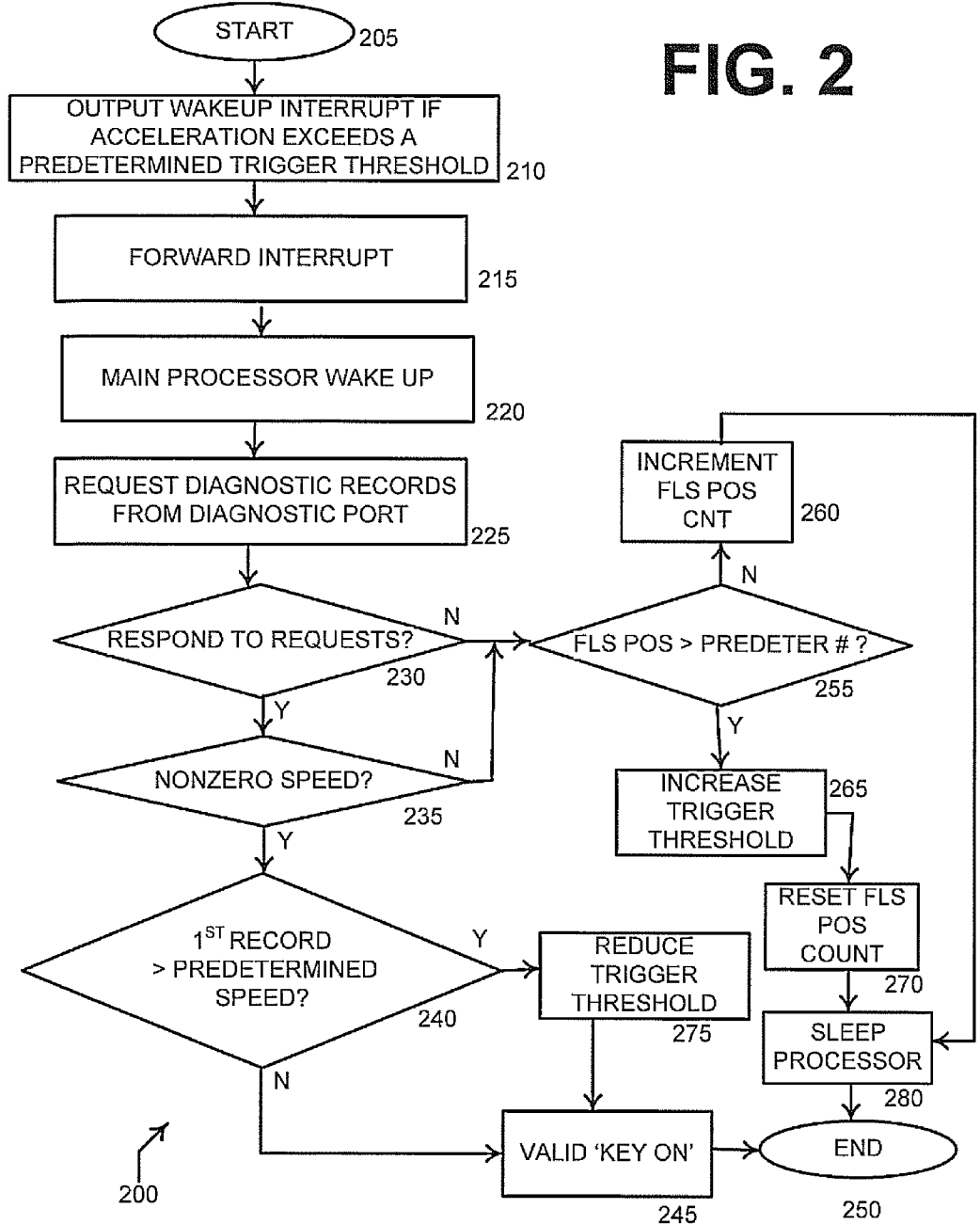
FIG. 2 illustrates a flow diagram of a method for detecting a key on condition.

To wake up upon receiving a wakeup command, and determine whether a false positive occurs, TCU 4 may perform method 200 illustrated in FIG. 2. Method 200 starts at step 205. At step 210, an accelerometer detects acceleration and generates an acceleration signal. The accelerometer then compares the acceleration signal value to a predetermined trigger threshold. If the acceleration signal value exceeds the trigger threshold, the accelerometer sends the acceleration signal, or wakeup command, to an auxiliary processor, which typically idles in a state that can recognize a wakeup command and then forward it to a main processor. At step 215, the main processor receives the wakeup command at an interrupt pin and then resumes operation from a low power 'sleep' mode at step 220.

At step 225, the main processor may request diagnostic records, or diagnostic information, from a diagnostic port. At step 230, the main processor determines whether the vehicle's diagnostic port is responding to requests for diagnostic records. It will be appreciated that the port is an interface, and that a vehicle's on board computer system coupled to the diagnostic port would be the device that would respond to requests.

If the determination at step 230 is yes, method 200 advances to step 235 and determines whether diagnostic information indicates that values corresponding to a speed parameter are non-zero. In an aspect, the speed parameters may be vehicle speed or engine speed. If the diagnostic information indicates that the either the vehicle speed or engine RPM are not zero, method 200 advances to step 240 where it makes a determination whether the first diagnostic record it receives in response to a request includes a speed parameter that indicates the vehicle is moving faster than a predetermined speed. If the determination at step 240 is no, method 200 advances to step 245 and sets a flag indicating that the wakeup command sent at step 210 is valid inasmuch as it was sent in response to operation of the vehicle's ignition device, such as a key, key fob, push button, etc. to a start, or run, position.

Returning to description of step 230, if method 200 running on TCU 4 determines that a false positive occurred, which term refers to a false detection of a key-on condition and subsequent wake up of the main processor, by following the 'N' path from either step 230 or step 235, the method advances to step 255 and determines whether a false positive count value exceeds a predetermined number of permitted false positives in a predetermined false count, or second, period. It will be appreciated that method 200 preferably will not follow the 'N' paths from steps 230 or 235 unless a predetermined first period has elapsed. In an aspect, the first period is five minutes and the second period is 24 hours. The first period permits time for the vehicle's on board computer to respond to requests, and to ensure that temporarily stopping at a stop sign, for example, does not prevent the method from following the 'Y' paths from steps 230 or 235.

At step 255, the main processor first determines whether the number of false positives equals a predetermined criteria, preferably five, and then compares time stamps of stored false positive event determination messages to determine whether the period between the first false positive since the false positive counter reset, and the last one exceeds the second period. If no, method 200 advances to step 260 where processor 16 increments the false positive count value, advances to step 280 where the processor puts itself into sleep mode, and ends at step 250.

If at step 255 method 200 determines that the number of false positives during the second period (based on time stamps of events recorded in the main processors flash memory, which may be part of the main processor or coupled thereto) exceeds a predetermined number of allowable false positives, the method advances to step 265 and increases the acceleration trigger threshold. At step 270, method 200 resets the false positive count value, instructs main processor 16 to sleep at step 280, and ends at step 250.

Returning to description of step 240, if method 200 determines that a first diagnostic record received in response to a request for diagnostic information made at step 225 indicates a vehicle speed of greater than a predetermined speed, such as, for example, 15 kilometer per hour, the method advances to step 275 and reduces the acceleration trigger threshold. At step 245 method 200 instructs the processor to set a 'key on' flag indicating that the interrupt at step 210 was in response to a valid operation of an ignition switch to on, and that the trigger threshold did not need adjusting. Method 200 then ends at step 250.

In an aspect, it is desirable to have the option to install and operate a TCU 4 in a vehicle without the need to connect an "ignition sense" wire to the device. This feature provides for a simplified and more reliable device installation procedure. This means that an installer has the option of simply providing the TCU 4 with an un-switched vehicle battery voltage supply, either from any readily available battery voltage source in the vehicle, or by using an OBD-II Y-cable which takes power from the OBD-II connector. This installation method also eliminates the need to find a suitable source for the "ignition sense" signal, something that can be quite complex, and varies greatly from vehicle model to vehicle model.

By monitoring the changes (or lack thereof) in vehicle battery voltage, the TCU's 4 acceleration (in all three dimensions), and the vehicle's GPS-derived motion over the ground, the TCU detect whether the engine is turning the vehicle's alternator, and determine if the vehicle is in motion.

Figure 4:
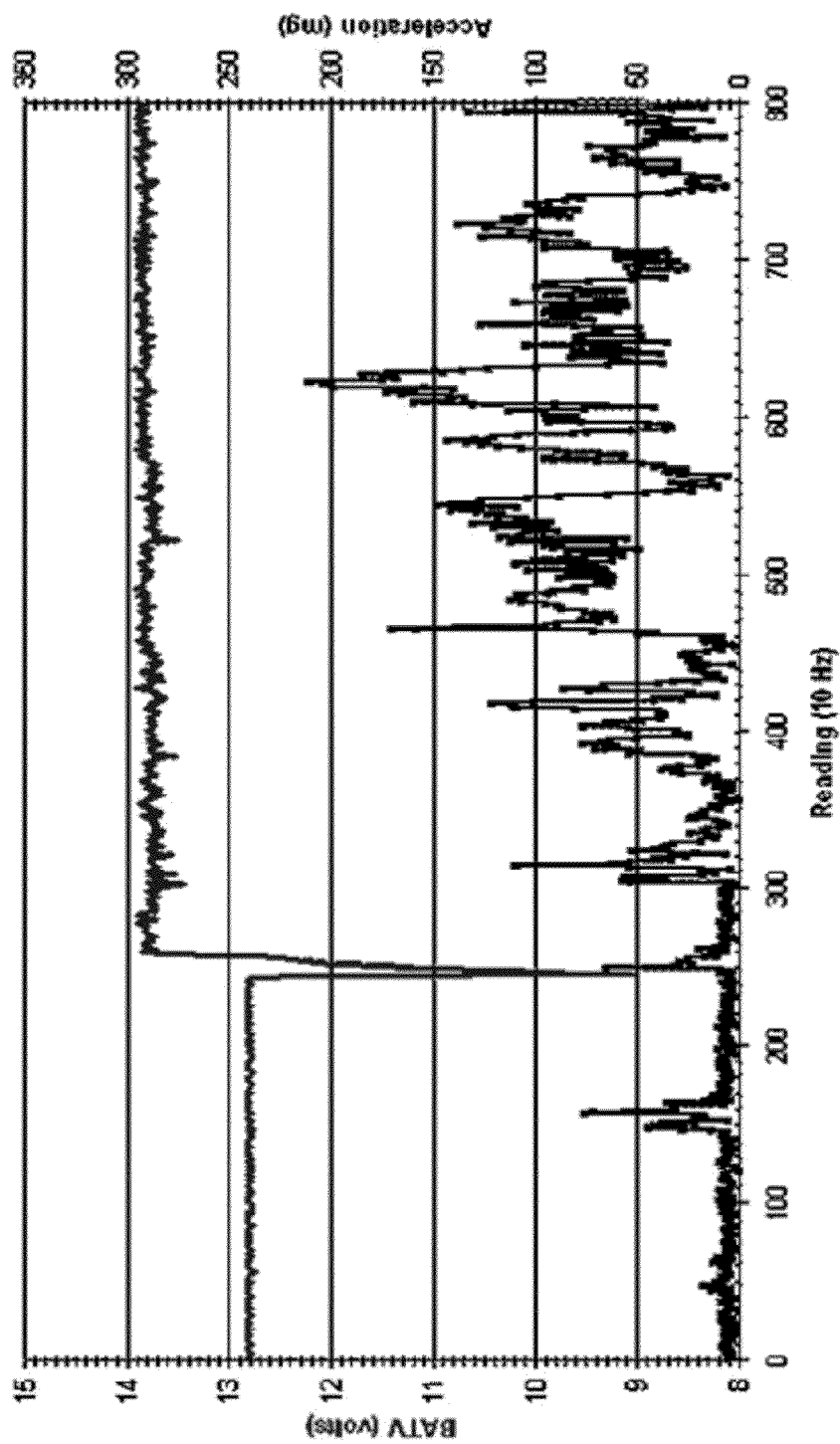
FIG. 4 illustrates a plot showing battery voltage and relative acceleration.

This data can be used to reliably infer the vehicle's "key state" without the need for an "ignition sense" input wire. Refer to the graph in FIG. 4 for an 80-second plot showing battery voltage and relative acceleration from an actual vehicle, including a period of time with the engine off, the "engine crank" event, the engine idling, and then the vehicle traveling over the road.

Testing also showed that although sensing a vehicle's battery voltage generally could be used to determine when the vehicle's alternator was charging the battery—and therefore when the engine definitely was running—normal variations in the battery's state-of-charge and in battery bus loading rendered this information unreliable for precisely determining when the engine was not running.

Battery Voltage Sensing:

In the case of trying to sense the ignition state by simply reading the battery voltage, a number of well-known problems exist. Quick rise in a vehicle's battery voltage (to something over 13.1 volts) can be used to reliably detect a "key on" condition in most vehicles (the exceptions being "hybrids" and vehicles with "clutched alternators"). However, a similar technique may not be reliable for reliable "key off" detection. This is because the battery voltage can be very slow to "fall" after an engine is turned off, due to lead-acid battery "surface charge" effects. This can lead to a false "key on" state for long periods after the engine has been turned off—periods of 1-10 minutes or more, depending upon the battery condition, state-of-charge, temperature, manufacturer, etc. Using a fixed battery is voltage for "key off" also means the vehicle is subject to false "key off" events due to battery voltage bus "droops", for example, when idling with a high electrical load (e.g., from headlights and/or the air conditioner compressor clutch).

What this implies is that although a drop in battery voltage can be used to signal a likely "key off" event, that event cannot be acted upon until it is confirmed by, for example, noting that the battery voltage continued to ramp downward for several more minutes or that the accelerometer and/or GPS position detected no motion for an extended period of time. The period between the initial detection of a likely "key off" event and the confirmation of that event would be considered a "conditional key off" state. However, at any time that state might be canceled and replaced by a "key on" state, should the battery voltage rebound, for example after the engine RPMs increased.

Vehicle Motion Sensing (Accelerometer):

Both a "conditional key off" and a "conditional key on" state support vehicle ignition key on and key off detection using a three-axis accelerometer 20. "Offsetting" and combining the X, Y and Z acceleration readings (i.e., to remove device mounting/orientation effects), changes in the "relative motion" of TCU 4—along any axis—can be used to reliably detect overall vehicle motion. However, when a vehicle is parked with the engine running, or idling at a stoplight, "relative motion" may be used to signal "conditional key off" and "conditional key on" states, and then later to convert these into confirmed "key on" and "key off" states, depending upon what happens over a period of time—sometimes in conjunction with measured voltages from the vehicle's battery bus and speed information from the GPS unit.

For example, a TCU 4 in a vehicle 6 that is parked, and only using accelerometer readings for ignition state determination, might enter the "conditional key on" state when motion is first detected, but only act on that event and send up a "key on" GPS fix if motion continues for 30 seconds or more—or if the GPS unit detected vehicle motion. Similarly, that same TCU 4 in the now moving vehicle 6 would enter the "conditional key off" state when motion stopped, but only record the onset of that state as a "key off" event if the motion stopped for several minutes—because the vehicle was actually parked, and not just waiting for an unusually long stoplight.

Vehicle Motion Sensing (GPS Unit):

Vehicle motion also can be detected—under most conditions—using the GPS 18 by monitoring and evaluating for non-zero GPS-derived vehicle speed values. Of course, for this to work the GPS module 18 should to be powered up and should have acquired a series of valid GPS positions. Because the GPS unit is typically maintained in a standby (or powered off) state when the vehicle is parked to conserve power, GPS data cannot be used as the primary determinant for "key on". Therefore, either the accelerometer (or the battery voltage) are typically used to first detect a "conditional key on" state, whereupon the GPS module 18 can be powered up and then used to confirm vehicle motion—using GPS-derived speed.

If the GPS module 18 is maintained in "standby state", the time to first fix, assuming the vehicle is parked outside, is very short—a few seconds. For the GPS module 18 to derive a vehicle speed, more than one GPS fix is needed, which adds a few seconds more to the process.

In addition, because of uncertainties in the GPS fix position, a "false" (low) speed can be reported by GPS module 18 that is in fact at rest. Therefore, a GPS-derived vehicle speed reading should be used to confirm a "key on" condition if the speed reading is sufficiently above zero—for example, more than about 3 MPH.

Combination Sensing:

Ideally, vehicle battery voltage, the accelerometer-derived "relative motion" and possibly GPS-derived non-zero speed would be combined to cause ignition key state transitions from "key off", to "conditional key on", to "key on", to "conditional key off" and then back to "key off". Whatever the method used, the combined data from the various sensors needs to deal with real world situations such as long traffic stoplights, traffic jams and stop-and-go driving conditions, underground parking garages with no GPS coverage, electrical systems with weak alternators and/or or heavy auxiliary electrical loads, etc.

For those vehicles that do not rely on all sources of information at all times, for example, battery voltage readings in "hybrid" vehicles and/or newer models with "clutched alternators", predefined flags in TCU 4 "manufacturer" status word (e.g., INH_BATV, HYBRID) could be used to "tune" the state machine behavior as needed. However, a "one size fits all" algorithm which should work with all "normal" vehicle types without the need for Customer Care to set special "flags" is preferred.

Preferably, the INH_BATV flags is used, and if set, it indicates that only TCU's 4 "ignition wire" input should be used to sense "key on" and "key off". Some customers may need this wire connected and the INH_BATV flags set in TCU 4. Examples might be a TCU 4 installed in something like a "bucket truck", which could spend much of its time stationary, but with the engine running, in order to power the hydraulics that operate the "bucket". In this situation the accelerometer may not be sensitive enough to resolve all the actual "key on" and "key off" events associated with turning the engine on and off.

In an aspect, two conditional ignition key states besides "key on" and "key off", namely "conditional key on" and "conditional key off", allow for speculative execution of two key states in parallel when one of the "conditional" states was active, and to provide a way to "repair" the state of TCU's 4 program whenever one of these states is converted into either of the conventional confirmed "key on" or "key off" states.

While in either of the "conditional" ignition key states:
  The TCU's 4 program needs to suspend the uplink of all data to its wireless gateway until the "confirmed" state of the TCU is known (i.e., "key on" or "key off")
  Schema-defined registers need to be updated as if both the previously "confirmed" state and the "conditional" state are in effect at the same time
  Periodic schema data field integration needs to proceed as if both the previously "confirmed" state and the "conditional" state are in effect at the same time
  Periodic schema histogram updates need to proceed as if both the previously "confirmed" state and the "conditional" state are in effect at the same time After exiting either of the "conditional" ignition key states:
- TCU's 4 program needs to resume the uplink of data to the to wireless gateway including any data packets that would result from any "confirmed" state transitions (e.g., key on and key off GPS fixes)
- Schema-defined registers need to either revert to the previous state or jump forward to the state implied by the newly confirmed "conditional" state (i.e., state "repair")
- Periodic schema data field integration needs to either revert to the previous state or jump forward to the state implied by the newly confirmed "conditional" state (i.e., state "repair")
- Periodic schema histogram updates need to either revert to the previous state or jump forward to the state implied by the newly confirmed "conditional" state (i.e., state "repair")

The above logic implies that TCU 4 operating without input from the ignition key wire will usually show occasional delays in uplinking certain information "buffers" and GPS fixes while the TCU's firmware waits for confirmation of any active "conditional" ignition states. Because they can make full use of both battery voltage and vehicle motion sensors, most vehicles will not incur appreciable delay from this added logic for "key on" detection. However, "key off" confirmation and data uplink may be delayed as much as 3.5 minutes after the vehicle's ignition is actually turned off. This delay is because of the time required to distinguish a parked vehicle from a vehicle waiting with its engine running for long periods, for example, at a long traffic stoplight.

Processing both the current mode and changed mode logic may result in a slightly increased processing load on processor 16, due to continuously running a background task (i.e., "AccelRead") to:
- periodically sample the battery voltage and take X, Y and Z accelerometer readings,
- provide a short-term running average of the battery voltage (to reduce "noise"),
- calculate a standard deviation value for battery voltage readings,
- provide a "baseline", time-averaged reading "offset" for each of the three accelerometer inputs (needed to cancel device mounting orientation effects), and
- calculate the vector sum of the X, Y and Z channels (to derive an orientation-independent relative motion "vector" magnitude value).

In an example, an "AccelRead" task may be described as a continuously running uCOS background task named "AccelRead" is responsible for periodically sampling data from the XYZ accelerometer chip, as well as measuring the vehicle battery voltage (BATV). This task wakes up every 10 milliseconds to take measurements. To keep to a strict time schedule this uCOS task does not participate in the TCU's 4 normal cooperative, non-preemptive multitasking scheme (i.e., using AcquireToken( ) and ReleaseToken( )). Therefore standard console logging (e.g., using LOG( ) and ERR( )) does not occur inside this task. Special care also should be taken to not interact with global data which might be used by other uCOS tasks which are using the TCU's 4 normal cooperative, non-preemptive multitasking scheme.

Every tenth time it executes (i.e., 10 times per second) "AccelRead" instructs processor 16 to perform the following before going back to sleep for another 10 milliseconds:
- computes an average of the last ten accelerometer readings (X, Y and Z),
- computes an average (and standard deviation) of the last ten BATV readings,
- subtracts the current XYZ "running averages" from the is acceleration averages (i.e., "offset" values),
- computes the "relative" acceleration "vector" (V) from the "offset-adjusted" X, Y and Z values (i.e., vector sum),
- updates a 6-second "running average" of the last 60 average acceleration readings (Y, Y and Z),
- records the results of the above calculations in a circular queue (i.e., AccelRecs[ ]) for possible uplink of debug packets, using UplinkAccelRecsBuf( ) routine,
- computes the "movement state" (AccelMoving) using an adjustable threshold (MOVEMENT_MG) with a 2-second hysteresis, and finally
- calls UpdateRules( ) to update the current state of all "rules" used by the "key state" transition tables (i.e., TransRules[ ]).

Note that if enabled by "bReadModemVolts" the "AccelRead" task also reads the GPRS modem's power supply voltage every 10 milliseconds and updates the minimum and maximum voltage readings (i.e., minModemMv and maxModemMv). This feature is used strictly for test purposes. For purposes of discussion, processor 16 may include the wireless gateway and the GPRS modem.

Note also that "AccelRead" has a debug feature, enabled by "forceAccelMoving", that allows manual override of the "movement state" (AccelMoving) through the use of console commands. When this mode is in use, the actual accelerometer XYZ readings are not used to compute the "movement state" variable "AccelMoving". Instead "AccelRead" uses appropriate values to simulate movement or non-movement, as commanded by the "debug move, on" and/or "debug move, off" console commands.

"Key State" Transition Rules Processing:

When operating without a "hardwired" ignition signal TCU 4 uses a set of "transition rules" in order to determine which of the four possible "key states" it should be in. Each of the "key states" is assigned a number as follows (see "rules.h"):

```
#define KEY_OFF   0
#define KEY_ON    1
#define COND_KEY_OFF 2
#define COND_KEY_ON 3
```

The global variable "key_on_cond" holds a value corresponding to one of these four key states. By examining the value stored in "key_on_cond" the firmware can instantly determine if it is operating in a "conditional" key state. At all times, as has always been the case, the global variable "key_on" either holds the value KEY_OFF or KEY_ON. However, during "conditional" key state execution mode, this variable alternates between KEY_OFF and KEY_ON, once per timer-based schema schedule execution cycle. Note that if the INH_BATV flag bit is set in the TCU 4 status MANUF status word (i.e., cr_status[CRS_MANUF] bit 12) then "key state" transitions are strictly between "KEY_OFF" and "KEY_ON". Which key state, KEY_ON or KEY_OFF, is dictated by the state of the TCU's "ignition wire". In this case the key state transition rules and associated firmware logic described here are not used at all. The actual rules for transition from one "key state" to another are defined using a series of data tables and C macros (see "rules.h"). Table 1 shows a list of these key state transition rules:

TABLE 1

| Name | Rule |
| --- | --- |
| BATV_high | BATV >13.400 V for 5 s |
| BATV_charging | BATV >13.600 V for 3 s |
| any_motion | MOTION >=20 mg for 5 s |
| motion_short | MOTION >=20 mg for 25 s |
| no_motion_short | MOTION <20 mg for 25 s |
| no_motion_long | MOTION <20 mg for 210 s |
| maybe_parked | GPSVSS <=5.0 kph for 25 s |
| parked | GPSVSS <=5.0 kph for 210 s |
| traveling | GPSVSS >5.0 kph for 5 s |

BATV refers to the latest 100-millisecond average vehicle battery voltage reading. MOTION refers to the current relative acceleration vector (V) computed by the "AccelRead" task, which is compared to a fixed "movement threshold" (e.g., 20 milligravities). GPSVSS refers to the latest GPS-derived vehicle speed.

Each rule is re-evaluated every 10 milliseconds when the "AccelRead" task calls the routine "UpdateRules". At any given time each rule is either "true" or "false". For example, the "BATV_high" rule will be "true" if and only if the vehicle battery voltage has read over 13.4 volts continuously for 5 seconds or more. Note that if the GPS module is powered off or is in "standby" mode, or if the GPS module cannot return a valid GPS fix, then any "GPSVSS" rule will be "false".

One can see from the above table that each rule contains at least two values, a "threshold" value and a time, in seconds. Most of the time, using fixed universal constants for these values is fine. But, at other times, having the option to "tune" the rule values on a vehicle-by-vehicle basis may be needed. Therefore, there is a provision to specify a constant "default" value for either of the two rule values (i.e., the threshold and/or the minimum time), but still allow for override of the default value using data stored in CRS_PARMS1 and CRS_PARMS2 of the TCU's "status buffer" (i.e., CrStat words 40 and 41).

Therefore, when specifying a key state transition rule, either of the two normally-fixed values can be coded in the rule-definition tables to specify that the actual rule value should be derived by referencing an entry in the special "parameter lookup table" named "RuleParms". The "RuleParms" Table 2 contains the following information (see "rules.h"):

TABLE 2

| Parameter | CRS_PARMS? Bits | Default | Scale Factor | Units |
| --- | --- | --- | --- | --- |
| BATV_HIGH | CRS_PARMS1[31:24] | 134 | 100 | mV |
| BATV_CHARGE | CRS_PARMS1[23:16] | 136 | 100 | mV |
| PARK_PERIOD | CRS_PARMS1[15:8] | 210/10 | 10 | sec |
| GPS_VSS_MIN | CRS_PARMS1[7:0] | 50 | 1 | 0.1 KPH |
| MOVEMENT_MG | CRS_PARMS2[31:24] | 2 | 1 | mg |

Note that values stored in CRS_PARMS1 and CRS_PARMS2 are limited to 8 bits. Therefore a "scale" factor is provided in the "RuleParms" table in order to extend the range of usable values, yet limit the amount of space required to specify a given value override.

For example, the "BATV_HIGH" parameter listed in the "RuleParms" table shows a default value of 134, with a "Scale Factor" of 100, yielding resultant value of 13400 mV. Changing the normally zero byte stored in the high byte of CRS_PARMS1 with 132 (i.e., setting the high byte of CRS_PARMS1 to 132) would change the BATV_HIGH threshold used in key state transitions rules to 132×100=13200 mV.

To change the "PARK_PERIOD" from the default of 210 seconds to 120 seconds for a given vehicle, the byte stored in CRS_PARMS1[15:8] would need to be changed to 120/10=12. To accomplish this using an over-the-air "zappo" command on the "arch" Website, one would need to write the value 12*256=0xc00 into TCU's 4 status word 40.

Figure 5:
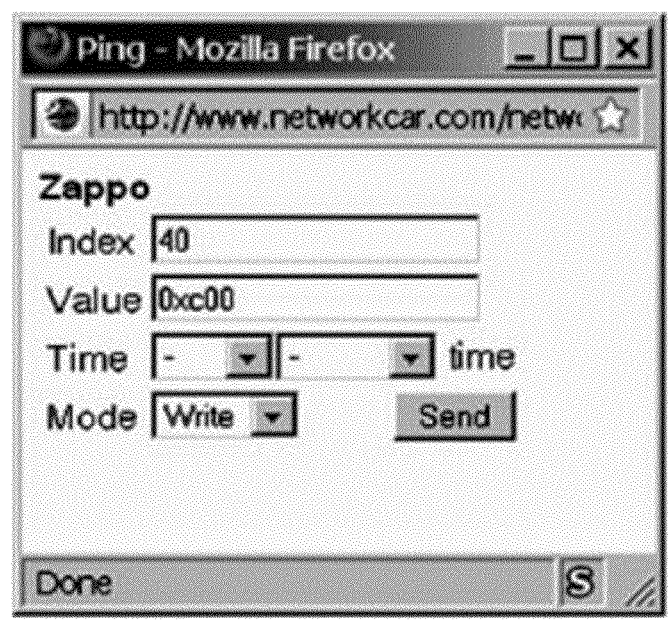
FIG. 5 illustrates a user interface for entering a console command.

Alternatively the TCU "console command" shown in FIG. 5 would accomplish this, namely changing the "PARK PERIOD" from the default value of 210 seconds to 120 seconds, while leaving all the other "RulesParms" default values unchanged:

crs CRS_PARMS1,0xc00

Note that five different "RuleParms" byte values stored in CRS_PARMS1 and CRS_PARMS2 are only used for override of the "Default" "RuleParms" table entry if and only if the byte values stored in CRS_PARMS1 and/or CRS_PARMS2 are non-zero.

Transitions between the four possible "key states" is defined by a set of tables; one "key state transition table" for each of the four possible "key states". Only one "key state transition table" is active at any given time. The active table is is selected based on the current "key state". The routine "ProcessRules" is called each time the schema is processed (typically every 2 seconds). "ProcessRules" will change the current "key state", and therefore the active table if the "rules" indicate that a state change is needed.

The following shows the logic which makes up the "key state" transition rules for each of the four different "key state transition tables":

```
KEY_OFF:
    IF (state == 0) THEN
        state => 1 IF (BATV >13.600V for 3s)
        state => 1 IF (GPSVSS >5.0kph for 5s)
        state => 3 IF (BATV >13.400V for 5s)
        state => 3 IF (MOTION >=20mg for 5s)
```

```
KEY_ON:
    IF (state == 1) THEN
        state => 2 IF (GPSVSS <=5.0kph for 25s) AND NOT
            (BATV >13.400V for 5s)
        state => 2 IF (MOTION <20mg for 25s) AND NOT
            (BATV >13.400V for 5s)
```

```
COND_KEY_OFF:
    IF (state == 2) THEN
        state => 0 IF (MOTION <20mg for 210s)
        state => 0 IF (GPSVSS <=5.0kph for 210s)
        state => 1 IF (BATV >13.400V for 5s)
        state => 1 IF (GPSVSS >5.0kph for 5s)
        state => 1 IF (MOTION >=20mg for 5s)
```

```
COND_KEY_ON:
    IF (state == 3) THEN
        state => 1 IF (BATV >13.600V for 3s)
        state => 1 IF (BATV >13.400V for 5s) AND
            (MOTION >=20mg for 5s)
        state => 1 IF (MOTION >=20mg for 25s)
        state => 1 IF (GPSVSS >5.0kph for 5s)
        state => 0 IF (MOTION <20mg for 25s) AND NOT
```

-continued (BATV >13.400V for 5s)
state => 0 IF (GPSVSS <=5.0kph for 25s) AND NOT (BATV >13.400V for 5s)

Note that each "table" has multiple "state transition rule" logical expressions. The "logical expressions" used for state transition consist of one or more "true/false rules". The "true/false rules" are the same as the named "key state transition rules" shown in the first table in the section. In the above table listings the more descriptive rule logic is listed instead of just the rule names—which is how these tables are actually specified in the C code (see "rules.h").

The logical expression lines are executed in the order shown each time "ProcessRules" is called. Execution stops at the first logical expression that evaluates as "true". Compound expressions are allowed, using "AND" or "AND NOT" to specify a compound logical expression. If none of the logical expressions evaluate as "true", then no "key state" change will be made by the "ProcessRules" routine.

If an actual "key state" change is called for because one of the logical expressions evaluated as "true", then "ProcessRules" will log state transition information to the console, including a human readable version of the logical expression from the table that caused the key state transition. For example:
>>>>KEY COND_OFF→ON: 9 TRUE GPSVSS>5.0 kph for 5 s (6.2 s)

"ProcessRules" will also make any needed calls to "CondExeBegin" or "CondExeEnd" to begin or end "conditional" execution, respectively. After each key state transition, "ProcessRules" will clear each and every rule's seconds counter and reset the rule state to "false". It is important to keep this fact in mind when examining the state transition rule logic.

Trying to specify key state transitions directly from one "conditional" key state to another "conditional" key state may be configured to be illegal. In other words, a transition from COND_KEY_ON to COND_KEY_OFF or from COND_KEY_ON to COND_KEY_OFF is not allowed in the "key state transition tables".

Execution During "Conditional" Key States:

While in either of the normal "key states" (i.e., KEY_OFF and KEY_ON) is the schema is processed every couple of seconds based on a timer and any data packets scheduled for uplink to the GPRS gateway are immediately scheduled for transmission without any delay.

However, as soon as TCU 4 transitions to a "conditional" key state (e.g., COND_KEY_OFF or COND_KEY_ON) the execution of the TCU instantly changes in such a way that allows it to defer the decision as to which "key state" is in fact going to be correct—the original key state or the new "conditional" key state. This is because a "conditional" key state is a provisional one, and can prove to be wrong—at any point in the future. If the "conditional" state proves to be wrong, the state of TCU 4 needs revert to original "non-conditional" one. One the other hand, if the "conditional" proves to be right, the state of TCU 4 needs to reflect this new key state, namely KEY_ON or KEY_OFF.

Other than the fact that TCU data packets might be delayed, from the point of view of someone watching TCU's 4 behavior from the GPRS gateway, the fact that TCU 4 entered a "conditional" (i.e., provisional) key state and then later cancelled that state should not be something that can ever be detected. The same applies to the situation where a "conditional" key state proved to be a good guess—no one should be able to detect that TCU 4 passed through the "conditional" key state before confirming that that different state was the correct one.

To facilitate some of the aspects described herein function as described, TCU 4 maintains a kind of "split personality" whenever a "conditional" key state is active. If, for example, the TCU 4 was in a KEY_OFF state and then transitioned to the COND_KEY_ON state, the TCU first needs to make two copies of the existing set of "state variables". This gives the TCU 4 two distinct: "personalities", one for "key off" and another for "key on". Then, as execution proceeds over time, the logic in the CTCU 4 needs to "do everything twice", once assuming that the key state is "on" and again assuming that the key state if "off". At some point in time the "conditional" key state will prove to be either right or wrong. At that point one of the two "personalities" (i.e., set "state variables") needs to be discarded and execution needs to return to the original, simple "single personality" mode using the surviving set of "state variables."

Because of the manner in which TCU 4 does its "important" work, namely through the use of the "schema", the schema's periodic "schedules", the schema's RAM-based data tables and "registers", and the TCU's status buffer (i.e., "cr_status" array), creating and maintaining a "split personality" is actually fairly straightforward because most of the "state variables" mentioned above are already collected and stored in a small number of well-defined blocks of RAM memory. Therefore, making a copy of these "state variables" and then switching them in and out to provide for "dual personality" execution is not that complex.

The following is a list of the "state variables" that are copied in order to "snapshot" the "important" state of TCU 4 that defines its "personality" at any given point in time:
status buffer ("cr_status" array)
schema data table ("schema_data" array)
schema "registers" ("BufState" array)
schema active "command" list ("active_command" array)
Miscellaneous "important" state ("CState" array)

The last item in the list, the "CState" array, was added specially to collect the small amount of miscellaneous "state variable" data that must be maintained in "dual personality" mode in order to make everything work properly. This data includes "key state dependent" variables used by the routines "UpdateCrStatus", "UpdateKeyOn", and "ReadGpsFix".

Note that not the entire "cr_status" array need be copied for the purposes of "dual personality" execution, but only those status words that may be affected by schema processing. This subset of status words include the following:
CRS_ODOMETER
CRS_KEYONS
CRS_KEYON
CRS_KEYOFF
CRS_CUM_KEYON
CRS_AIR
CRS_LRPM
CRS_ILOAD
CRS_RPM_MAP These words can be identified by calling the routine "IsCrStatusCond".

Also, while executing in the "conditional" key state, packets scheduled for transmission to the GPRS gateway by the schema need to be "held" in the modem TX queue until the "conditional" key state ends. In addition, any and all writes of non-volatile state (i.e., status buffer and the schema's NVRAM) to flash need to be suspended while "conditional" execution is in effect.

So, whenever a "conditional" key state is active, TCU 4 maintains two copies of the above listed data arrays—the "normal" set and the "alternate" set. The routines that manage these copies are "CondExeBegin", "CondExeSwap", "CondExe", and "CondExeEnd".

The "CondExeBegin" routine is used immediately before the "conditional" key state is entered. It simply copies the "normal" set of state variables into the "alternate" set.

The "CondExeSwap" routine is used to swap back and forth between the two active key states (i.e., the original one and the "conditional" one). During "conditional" execution, this routine is called twice, each time (and before) the schema "schedule" is run (i.e., with "ProcessSchedules") by the routine "CondExe". As stated before, during "conditional" execution the schema is always run twice—once for each "personality—once for "key on" and once for "key off". The global variable "key_on" contains the value KEY_OFF during "key off" execution and the value "KEY_ON" during "key on" execution.

The "CondExeEnd" routine is called once after the "conditional" key state finally comes to an end. The routine either "confirms" the "conditional" key state by using the "alternate" copy of the state variables to overwrite the "normal" ones, is or it simple discards the "alternate" set of state variables. Depending upon the decision, "CondExeSwap" is called one last time to invoke the chosen "key state".

The "CondExeEnd" routine also uses the routine "CleanPacketQueue" to do any needed "housekeeping" on the packets in the outgoing modem TX queue. Any packets that were placed in the queue by schema routines during the "conditional" execution phase are examined. Those that were queued due to the execution of the "winning" key state are released for immediate uplink to the GPRS gateway. Those packets that were queued due to the execution of the "discarded" key state are deleted from the modem TX queue.

Finally, the "CondExeEnd" routine saves the latest version of the non-volatile state of TCU 4 to flash (i.e., status buffer and the schema's NVRAM), and, if the "key state" has actually changed, the routine logs the new state (i.e., "on" or "off") to the console and updates the state of the "key on" LED.

For the purposes of firmware "debug" the various key state transitions can also be "forced" using the console commands "key on", "key off", "key cond,on" and "key cond,off". These console commands will end up calling "CondExeBegin" and "CondExeEnd" as required.

Relevant Console Commands:

The following is an alphabetical list of console commands which may be useful for configuration, test and debug of the logic relating to operating the TCU without an ignition wire:

accel [on|off]—turn accelerometer test on/off
    accel log—log accelerometer data
    accel uplink—uplink accelerometer data
    accel read—read accelerometer data (default)
    crs [W[,N]]—change value of CrStat word W to N
    debug move[,on|off|-1]—force movement state (-1=normal)
    gps vss[,kph]—force GPS speed to kph (debug only)
    key [on|off]—force key on/off
    key cond[,on|off]—conditional key on/off
    mon [on|off]—monitor modem power supply
    rules—display key on/off rules The "accel on" console command is useful for accelerometer monitoring. It outputs the accelerometer X, Y and Z readings over and over again on a single line, updated 10 times per second. Use "accel off" to turn off this feature.

The "accel log" console command will produce a tab-delimited stream of acceleration, GPS-derived speed and heading and battery voltage data readings, one line every 0.1 seconds. Sample output follows:

| accel log begin logging... | | | | | | | | |
|---|---|---|---|---|---|---|---|---|
| N | X | Y | Z | V | MPH | HEAD | BATV | SDmV |
| 18 | 2286 | 1152 | -2285 | 0 | -1 | 0 | 12.346 | 133 |
| 19 | 2286 | 1152 | -2285 | 0 | -1 | 0 | 12.161 | 133 |
| 20 | 2286 | 1152 | -2285 | 0 | -1 | 0 | 12.341 | 83 |
| 21 | 2286 | 1152 | -2285 | 0 | -1 | 0 | 12.283 | 83 |
| 22 | 2286 | 1152 | -2285 | 0 | -1 | 0 | 12.254 | 193 |

The column labeled "N" is the reading number, something that is incremented every 10 milliseconds by the "AccelRead" task. Note that due to scheduling of uCOS tasks in TCU 4 there may be "missing" points. To convert "N" into a time in seconds, multiply the value by 0.1 seconds.

Accelerometer values X, Y, Z and V are in milligravities (mg). The column labeled "V" is the position independent "relative" acceleration component used to detect "motion" and therefore will eventually "decay" to near zero if TCU 4 is at rest. The columns "MPH" and "HEAD" are GPS-derived speed in MPH and heading in degrees (0-359). A "MPH" reading of -1 means no GPS fix. The column labeled "SDmV" is the standard deviation of the average BATV reading shown, taken from the last ten 10-millisecond BATV samples. BATV and SDmV are both in millivolts (mV). Note that because of its high data rate, this command may interfere with the normal operation of TCU 4.

Figure 6:
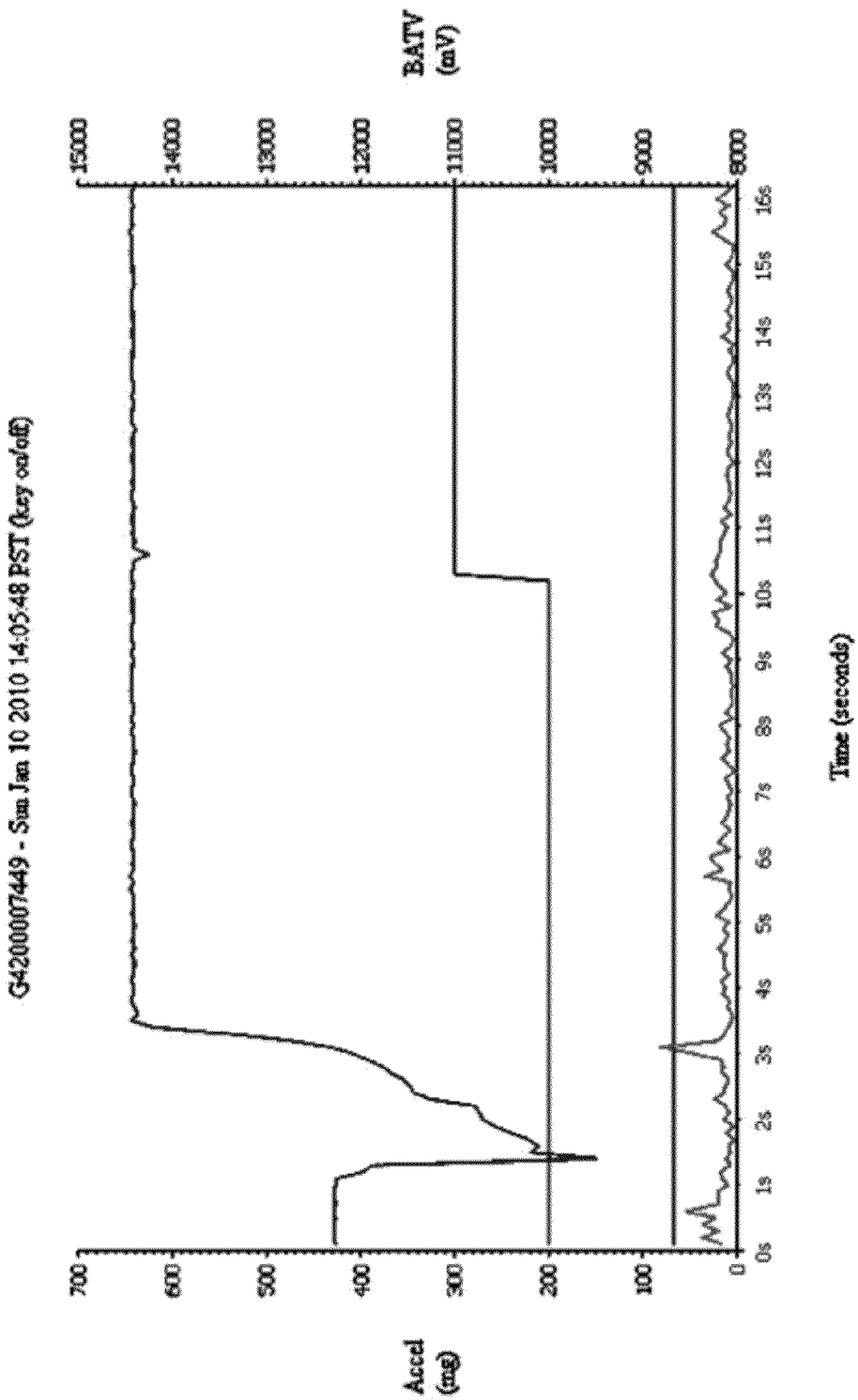
FIG. 6 illustrates unformatted TCU packet data in graphical form

The "accel uplink" console command causes a buffer with the last 16 seconds of BATV and acceleration "vector" data to be uplinked to the GPRS gateway. Also included is the "key state" and the GPS state (i.e., off, on, moving or not). This is an "unformatted" data buffer, with an "illegal" schema buffer number (i.e., zero), which can only be decoded with special Perl scripts. FIG. 6 shows a sample output generated by a Perl script which logs in and then screen scrapes archival Web pages and then outputs Javascript-based HTML code which display this "unformatted" TCU packet data in graphical form:

The "accel read" console command can be used to cancel the effects of the "accel log" command. The "crs CRS_PARMS1" and "crs CRS_PARMS2" console commands can be used to examine and/or change the byte values stored in TCU status words 40 and 41 respectively. The "arch" Website over-the-air is "zappo" command also can be used to change these values. Refer to the "RuleParms" data tables and related C comments in "rules.h" for information regarding exactly which bytes control which rule parameters.

The "debug move,on" and "debug move,off" console commands can be used to "force" the acceleration-based "movement" state variable on and off, respectively. This state variable is used by the MOTION key state transition rules. Use the console command "debug move,-1" to turn off the "forcing" function and return TCU 4 to normal operation.

The "gps vss,kph" console command can be used to "force" the GPS-based speed state variable to a given state. The command "gps vss,0" simulates a stopped vehicle and "gps vss,10" would force the speed to 10 KPH. This state variable is used by the GPSVSS key state transition rules. Use the console command "gps vss,-1" to turn off the "forcing" function and return the TCU to normal operation.

The "key on", "key off", "key cond,on" and "key cond,off" console commands that unconditionally "force" key state transitions to KEY_ON, KEY_OFF, COND_KEY_ON and COND_KEY_OFF respectively. These "forcing" functions disable and completely override the normal "key state" transition logic. These commands are strictly for firmware debug purposes. The only way to reverse the effects of these commands is to either "reset" or power-cycle TCU 4.

The "mon", "mon on" and "mon off" console commands are used to control monitoring of TCU's 4 GPRS modem module power supply voltage. Use "mon on" and "mon off" to turn on and off the power monitoring function. Use "mon" to display the range of modem power supply voltages sampled by the "AccelRead" task since the last "mon" command. This command also resets the minimum and maximum values. Sample command output is as follows:

mon
RF modem supply (mV): 3948 . . . 4099 (3.82%)

The "rules" console command displays the current key state, GPS speed, BATV reading, "motion" state, the key state transition rules table for each of the four key states, along with a list of the individual rules, all in "human readable" form. Below is sample console output:

```
rules
Key: ON
GPS: on, mode 3, VSS 100 KPH
BATV: 12207 mV
Moving: no
KEY_OFF (0):
    next=>1: 2 FALSE BATV >13.600V for 3s (0.0s)
    next=>1: 9 TRUE GPSVSS >5.0kph for 5s (22.8s)
    next=>3: 1 FALSE BATV >13.400V for 5s (0.0s)
    next=>3: 3 FALSE MOTION >=20mg for 5s (0.0s)
KEY_ON (1):
    next=>2: 7 FALSE GPSVSS <=5.0kph for 25s (0.0s)
        AND NOT 1 FALSE BATV >13.400V for 5s (0.0s)
    next=>2: 5 FALSE MOTION <20mg for 25s (22.8s)
        AND NOT 1 FALSE BATV >13.400V for 5s (0.0s)
COND_KEY_OFF (2):
    next=>0: 6 FALSE MOTION <20mg for 210s (22.8s)
    next=>0: 8 FALSE GPSVSS <=5.0kph for 210s (0.0s)
    next=>1: 1 FALSE BATV >13.400V for 5s (0.0s)
    next=>1: 9 TRUE GPSVSS >5.0kph for 5s (22.8s)
    next=>1: 3 FALSE MOTION >=20mg for 5s (0.0s)
COND_KEY_ON (3):
    next=>1: 2 FALSE BATV >13.600V for 3s (0.0s)
    next=>1: 1 FALSE BATV >13.400V for 5s (0.0s)
        AND 3 FALSE MOTION >=20mg for 5s (0.0s)
    next=>1: 4 FALSE MOTION >=20mg for 25s (0.0s)
    next=>1: 9 TRUE GPSVSS >5.0kph for 5s (22.9s)
    next=>0: 5 FALSE MOTION <20mg for 25s (22.9s)
        AND NOT 1 FALSE BATV >13.400V for 5s (0.0s)
    next=>0: 7 FALSE GPSVSS <=5.0kph for 25s (0.0s)
        AND NOT 1 FALSE BATV >13.400V for 5s (0.0s)
Rules (9):
    0: 3 FALSE MOTION >=20mg for 5s (0.0s)
    1: 4 FALSE MOTION >=20mg for 25s (0.0s)
    2: 5 FALSE MOTION <20mg for 25s (22.9s)
    3: 6 FALSE MOTION <20mg for 210s (22.9s)
    4: 7 FALSE GPSVSS <=5.0kph for 25s (0.0s)
    5: 8 FALSE GPSVSS <=5.0kph for 210s (0.0s)
    6: 9 TRUE GPSVSS >5.0kph for 5s (22.9s)
    7: 1 FALSE BATV >13.400V for 5s (0.0s)
    8: 2 FALSE BATV >13.600V for 3s (0.0s)
```

Note that in all cases each rule listed by the "rules" console command is prefixed with the "rule number" and rule's true/false state (i.e., either "TRUE" or "FALSE") and post fixed with the rule's "seconds counter", in parenthesis—showing the amount of time (in seconds) that the rule's Boolean comparison has been true. In the above example rule #9 (i.e., "GPSVSS>5.0 kph for 5 s") has gone 22.9 seconds with the GPS-derived speed (i.e., GPSVSS) greater than 5.0 KPH.

Note that 5 KPH, not zero, is used as the threshold for a stopped vehicle when using GPS-derived speed. This is because a stationary GPS module will sometimes falsely report a non-zero speed. This is because of apparent (small) motion due to unavoidable GPS fix positional errors. A stationary GPS module will appear to "wander" about a fixed latitude/longitude point because of these errors, and, depending upon the magnitude of the errors, a non-zero apparent speed will be reported by the GPS module.

Key on Detection Rules:

BATV readings can usually be used for instant, reliable detection of "key on", but in situations where reliable BATV readings are not available (such as with "hybrid" vehicles), TCU 4 can still reliably detect "key on" by using "conditional key on" logic, with confirmation of vehicle motion through a combination of GPS-derived speed readings and extended periods of vehicle motion sensed with the XYZ accelerometer.

The following KEY_OFF "key state transition table" shows how this logic works:

```
IF (state == 0) THEN
    state => 1 IF (BATV >13.600V for 3s)
    state => 1 IF (GPSVSS >5.0kph for 5s)
    state => 3 IF (BATV >13.400V for 5s)
    state => 3 IF (MOTION >=20mg for 5s)
```

Without a high BATV voltage reading, at least 5 seconds of vehicle motion, usually sensed by the accelerometer, will cause a key state transition to COND_KEY_ON mode (i.e., key state 3).

At that point the following COND_KEY_OFF "key state transition table" takes effect:

```
IF (state == 3) THEN
    state => 1 IF (BATV >13.600V for 3s)
    state => 1 IF (BATV >13.400V for 5s) AND
        (MOTION >=20mg for 5s)
    state => 1 IF (MOTION >=20mg for 25s)
    state => 1 IF (GPSVSS >5.0kph for 5s)
    state => 0 IF (MOTION <20mg for 25s) AND NOT
        (BATV >13.400V for 5s)
    state => 0 IF (GPSVSS <=5.0kph for 25s) AND NOT
        (BATV >13.400V for 5s)
```

In this mode the GPS module will be enabled. If motion continues for another 25 seconds, either detected by the XYZ accelerometer or by the GPS unit, then TCU 4 will transition to KEY_ON mode (i.e., key state 1). Otherwise it will return to KEY_OFF mode (i.e., key state 0).

In fact, high BATV readings that definitely indicate battery charging (and therefore a running engine) are effective in most vehicles, under most conditions. But, in other situations, such as with "hybrid" vehicles, the given "key on" logic works just fine. As a result, no "special" manual configuration of the TCU is required for "special circumstances", such as installation in "hybrid" vehicles.

Key Off Detection Rules:

In an aspect, key state transition rules may be specified such that the only path from the "key on" state to the "key off" state is via the "conditional key off" state. Specifically, the "condition key off" state is entered if and only if the vehicle is stopped for about 25 seconds—indicated by no "motion" from the accelerometer or zero (or low) speed from the GPS module, but only if the BATV reading is under 13.4 volts, for example. In an aspect, the rules may be used:

```
KEY_ON (1):
    next=>2: 7 FALSE GPSVSS <=5.0kph for 25s (0.0s)
        AND NOT 1 FALSE BATV >13.400V for 5s (0.0s)
    next=>2: 5 FALSE MOTION <20mg for 25s (22.8s)
        AND NOT 1 FALSE BATV >13.400V for 5s (0.0s)
```

In order for the "key state" to transition to a non-conditional "key off" state then vehicle must remain stopped for a total of 3.5 minutes (i.e., 210 seconds). This rule specifies such a long time period to allow for long traffic stoplights and/or long waits in stopped traffic. The rules are as follows:

```
COND_KEY_OFF (2):
    next=>0: 6 FALSE MOTION <20mg for 210s (22.8s)
    next=>0: 8 FALSE GPSVSS <=5.0kph for 210s (0.0s)
    next=>1: 1 FALSE BATV >13.400V for 5s (0.0s)
    next=>1: 9 TRUE GPSVSS >5.0kph for 5s (22.8s)
    next=>1: 3 FALSE MOTION >=20mg for 5s (0.0s)
```

Note that the "key state" reverts to unconditional "key on" if any motion is detected or if the BATV reading exceeds 13.4 volts.

Difficulty may arise with these "key off" detection rules in that very short is vehicle stops (i.e., under 3.5 minutes) may not be detected, even though the engine may have been turned off. The net effect of this behavior will be to combine two "trips" into a single "trip" in the vehicle's "trip reports" at the Networkfleet Website.

Another effect of "key off" detection rules is that the transmission of a normal "key off" GPS fix to the GPRS gateway will be delayed for about: 3.5 minutes, when compared to a TCU which uses the ignition wire (or the OBD bus) to detect "key off".

Mostly Stationary Vehicles (Heavy Equipment, Excavators, Bucket Trucks):

A TCU installed in vehicles which spend much of their time stationary, but with the engine running, may report "false stops" unless it is configured to use a "hardwired" ignition signal. This is the direct result of the "key state" transition rules employed when there is no ignition wire connected.

Depending upon the situation, a vehicle like a "bucket truck" or an excavator, which tends to spend a lot of time parked, with the engine running to power its auxiliary hydraulic equipment, may repeatedly "key off" while the engine is in fact still running. While such a vehicle is stationary, unless regular motion is detected by accelerometer 20 (i.e., above a programmed threshold, e.g., every 210 seconds or less), TCU 4 will "key off" and report this event to the Networkfleet datacenter.

Therefore, the "no ignition wire" aspect may not be an ideal solution for certain vehicles such as these. Instead, using a "hardwired" ignition wire attached and configured with the BATV_INH flag bit in the CRS_MANUF status word set is preferred.

Using BATV Noise to Detect Ignition On:

Another potential way to detect a running engine without the need to "hardware" an ignition signal is to measure the noise level on the vehicle battery bus. Thus, a "noise level" measurement for the BATV readings in the form of the standard deviation of the 10-millisecond BATV voltage readings, every 100 milliseconds is provided.

Figure 7:
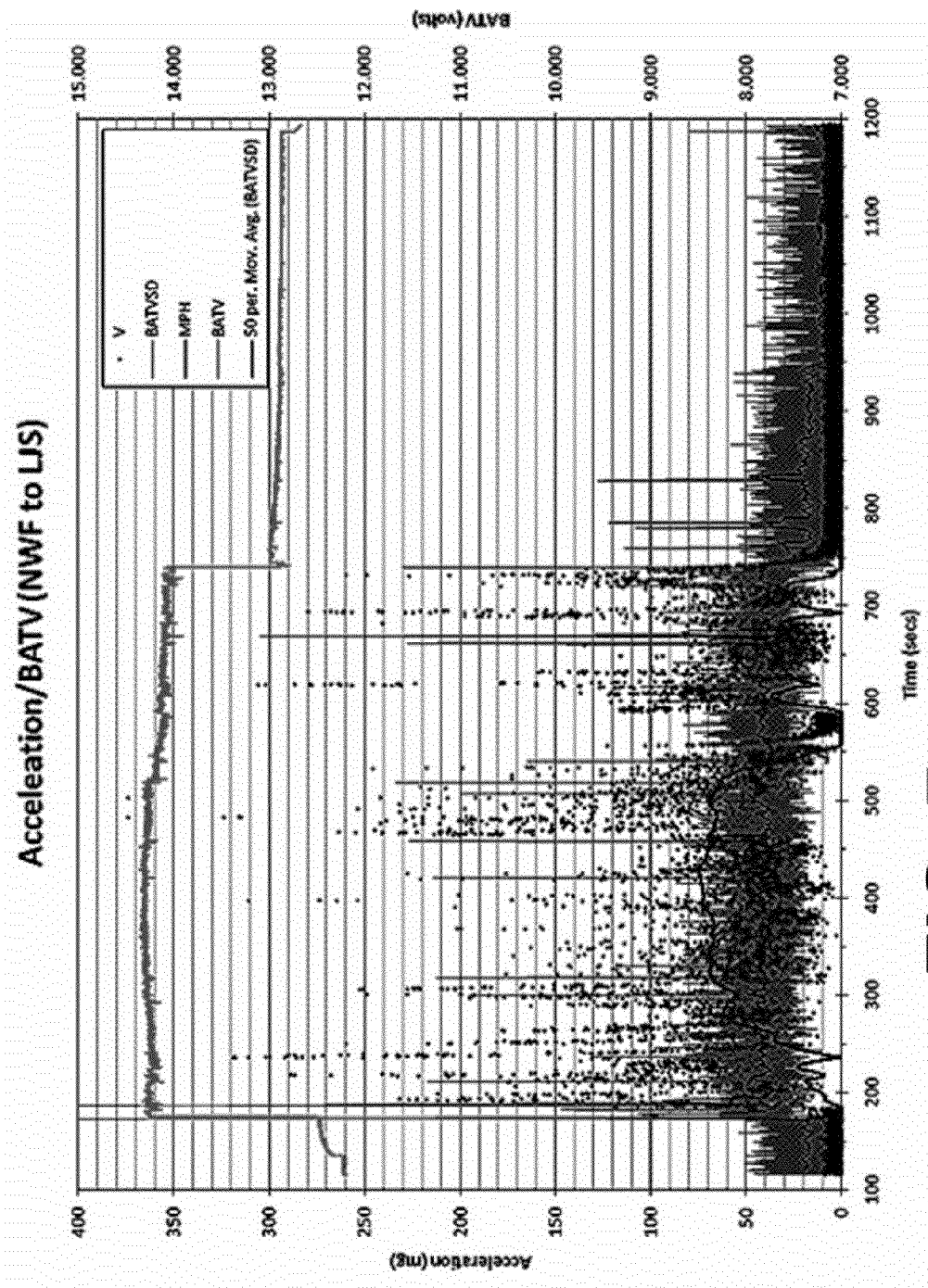
FIG. 7 illustrates a plot of about 20 minutes of "accel log" data.

Testing on a single vehicle, a 1999 Chevrolet Suburban, indicates that this BATV standard deviation value (i.e., BATV "noise level") clearly is elevated while the engine is on (i.e., averaging 30-40 mV) and returns to a substantially lower value (i.e., averaging 10-20 mV) when the engine is off. Individual 100-millisecond standard deviation readings are quite "noisy" (i.e., the "noise level" is "noisy"), varying ±20-30 mV about the 5-second running average (see graph). The key off "noise level" also seems to step down to a substantially lower value (i.e., ~100 mV from ~20 mV) once the vehicle is allowed to sit idle for a few minutes. FIG. 7 illustrates a plot of about 20 minutes of "accel log" data collected from the 1999 Chevrolet Suburban.

Logic for Vehicles with 24V Battery Systems:

A TCU may be configured to work automatically on vehicles with dual 12V battery systems. Such vehicles have a nominal battery voltage (BATV) in the range of about 24-30 volts. In order to accommodate such vehicles without the need to connect an "ignition wire" to the TCU, when installed in a 24V system, all the BATV thresholds used by the "key state" transition rules should be doubled to reflect the higher battery voltages in such a vehicle.

To facilitate operation, TCU's 4 operating application starts (i.e., after power up and/or "reset"), and the TCU's firmware samples BATV over a two-second period in order to detect the vehicle's battery system voltage. If the BATV reading is found to be less than 18 volts, then the BATV thresholds of all applicable "key state transitions rules" behave exactly as described in this document. However, if all BATV readings are found to be 18 volts or higher over this two-second start up period, then a global flag named "b24VSystem" will be set non-zero. When this flag is set all the rules' BATV thresholds must be scaled up by a factor of two. This scaling affects the rules processing and side effects, as well as any firmware that "dump" the rules to the console in "human readable" form. For example, the "BATV_high" rule would read "BATV>26.800V for 5 s" instead of "BATV>13.400V for 5 s".

An 18 volt threshold for "dual battery system" detection was selected so that it is high enough that a "single battery 12V system" never would be erroneously flagged as a 24V system, for example if the TCU 4 is reset in conditions with an unusually battery high charging voltage (e.g., a discharged 12V battery in very cold weather can initially charge at ~16V). Note that there is a slight chance that if a TCU in a 24V vehicle happened to restart during engine "crank", the firmware might erroneously flag the vehicle as a having a 12V system. This might happen due to an (infrequent) over-the-air "reset", but is very unlikely to happen spontaneously due to a "brown-out" reset of a TCU in a 24V system—BATV would have to drop from a nominal 24V down to less than ~4V before processor 16 would reset. Even during extended engine "crank" this is an unlikely scenario.

Figure 3:
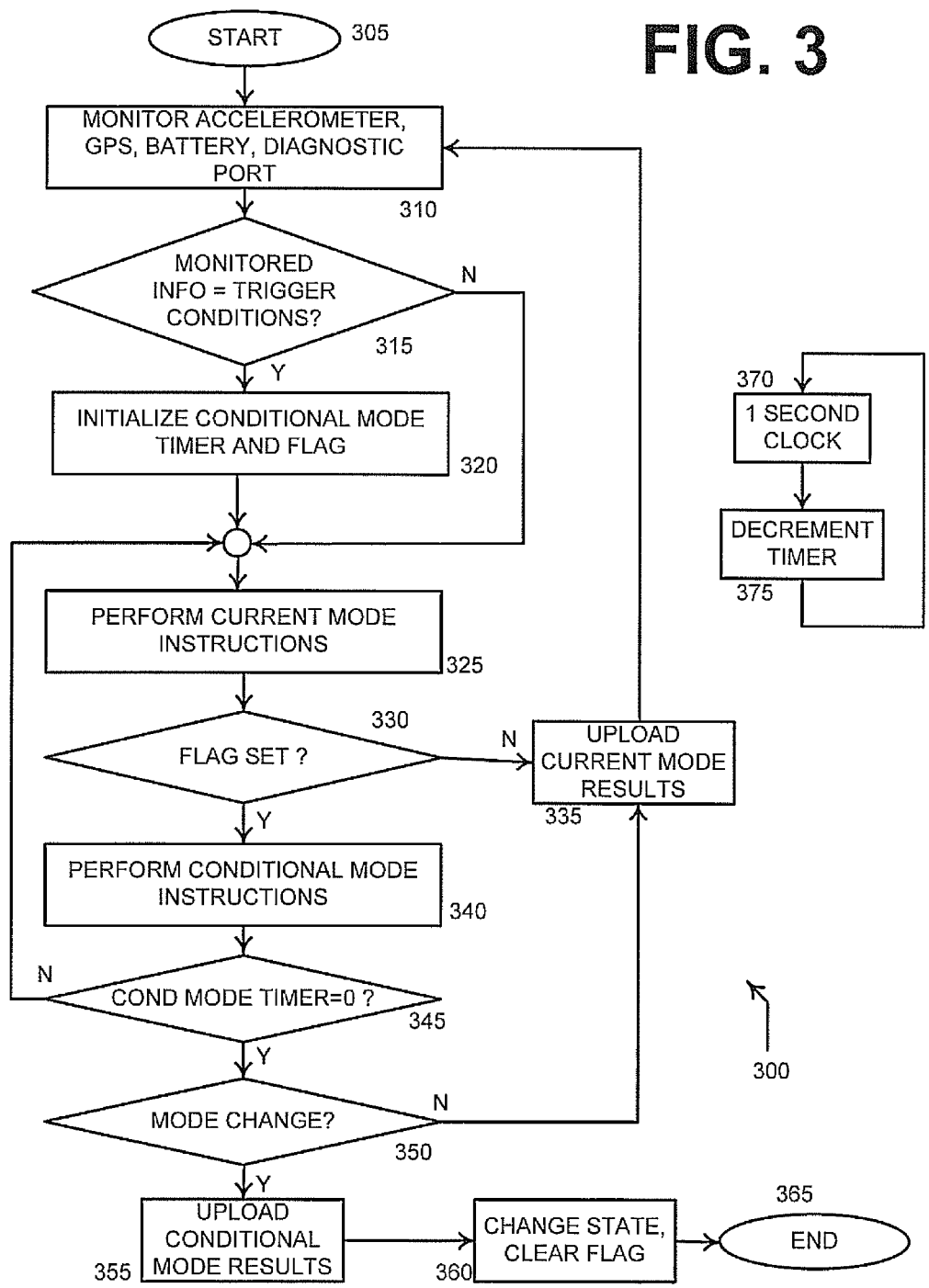
FIG. 3 illustrates a method for performing actions upon determination that a key off condition occurred.

Turning now to description of FIG. 3, the figure illustrates a flow diagram of a method 300 running on a TCU for detecting that a user of a vehicle has operated an ignition device to a changed position (e.g., operating the vehicle's ignition key from an 'on' position to an 'off' position, or otherwise operated the device to turn off the vehicle. Method 300 starts at step 305. At step 310, method 300 monitors parameters, such as, for example, an acceleration signal value from accelerometer 20 shown in FIG. 1, battery voltage from battery 26, location information from GPS module 28, and diagnostic information from diagnostic port 24.

If one, or any combination of values for the monitored parameters meet predetermined conditional key-off criteria at step 315, method 300 initializes a conditional mode timer (either a counter, or using a system timer represented by steps 370 and 375) and sets a flag at step 320 indicating that a potential change in operational state of the vehicle may have occurred. For example, if GPS location information, or on board diagnostic computer information, indicates speed of the vehicle is below a predetermined threshold for a predetermined period, or an acceleration value from an accelerometer is less than a predetermined value, then the conditions at step 315 would be met and method 300 could determine that the driver of the vehicle may have turned off the key or otherwise turned off the vehicle.

After setting the flag and starting the conditional mode timer, processor 16 may operate in a conditional mode, or dual mode, of operation. In an aspect, processor 16 performs two modes of operation during the conditional mode period, during which processor 16 processes information monitored and acquired from sensors via a diagnostic port, from a GPS module, from a battery voltage monitor system, from accelerometers, etc. according to rules that apply when the vehicle is on, or running. Also during the conditional mode period, processor 16 processes information from the same sensor and module inputs according to rules that apply when the vehicle enters an 'off' operation mode. As an example of two different processing rule sets, processor 16 may be configured to acquire, store, and report vehicle location to a remote server periodically, for example every two minutes, while the vehicle is running. But, when a driver turns off the vehicle and the vehicle enters an 'off' mode, the rules may require that processor 16 acquire, store, and transmit the GPS location of the vehicle when the vehicle was turned off, and then not transmit location information again until the vehicle is turned back on again.

Thus, at step 325, processor 16 may perform data acquisition (monitoring), sorting, evaluating, calculating and reporting processes for the current mode scenario where the vehicle is on according to a current mode rule set. If a determination is made at step 330 that the conditional mode flag was not set at step 320, method 300 uploads information and data at step 335 according to the current mode rule set and returns to step 310. It will be appreciated that if the current mode is 'on', or 'run', processor 16 may monitor information for regular upload to a remote server at step 310. However, of the current mode is 'off' processor 16 may monitor information at step 310 according to rules that evaluate monitored information to determine whether an operator moved an operational mode selecting device from an off position to an on position (i.e., a driver turned the ignition key from off to 'on' or 'start.' In addition, upload of information may not occur at every iteration of step 335. For example, data may be uploaded from TCU 4 to remote server 10 every two minutes.

If the determination at step 330 is that the conditional mode flag was set at step 320, method 300 advances to step 340 and performs conditional mode instructions. These instructions may include data acquisition (monitoring), sorting, evaluating, calculating and reporting, for example, the vehicle's location information and fuel level when the driver turned the key of the vehicle from 'on' to 'off.' If the conditional mode timer set at step 320 and operating according to steps 370 and 375, for example, has not counted down to zero, or 'timed out', method 300 returns to step 325.

If, however, the conditional mode timer has timed out at step 345, processor 16 compares information monitored during previous steps (310, 325, and or 340) to a set of change mode criteria to confirm that the operational mode of the vehicle changed. To satisfy the conditional mode trigger criteria at step 315, speed or acceleration may have been zero or almost zero. However, in an aspect, the change mode criteria at step 350 may be met if vehicle speed is less than a predetermined threshold, and the vehicle's acceleration (average magnitude of acceleration of three axes) is almost zero, and the vehicle's battery voltage is below a predetermined.

In the embodiment just described, the change mode criteria requires stronger evidence that the vehicle was turned off than the conditional mode criteria of step 315. Having differing criteria for conditional and change mode determinations allows the TCU to begin performing actions that are desired when the vehicle is shut down while also continuing to acquire data and perform actions thereon as if the vehicle has not been turned off during a conditional mode period. Thus, if speed or acceleration are almost zero for an extended period, for example at a very long traffic light, traffic jam, a slow queue to exit a fleet corral, the TCU can continue to acquire and process information and data as it normally would according rules corresponding to a current mode of 'on' but essentially simultaneously also perform operations according to a different set of rules that correspond to the vehicle entering a changed mode of 'off.' If the conditional mode criteria are not met at step 350, method 300 causes processor 16 to determine that information monitored at steps 325 or 340 indicates that the mode has not changed, and processor 16 reports at step 335 the results of performing instructions according to the current mode rule set at iterations of step 325. If, however, processor determines at step 350 that mode change criteria have been met by monitored information and data, method 300 causes processor 16 to upload at step 355 results of performing instructions according to a condition mode rule set during iterations of step 340.

At step 360, the conditional flag is cleared and processor may be put into a sleep mode if the current condition was 'on' and the mode changed to 'off.' Method 300 ends at step 365.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for determining that a user has operated a vehicle's operational mode selecting device, comprising:
   monitoring information corresponding to an output signal level from an accelerometer of a telematics device coupled to the vehicle;
   monitoring information corresponding to a positioning module of the telematics device;
   monitoring information corresponding to the vehicle's battery voltage;
   determining that monitored information met trigger conditions indicating a potential change of state of the vehicle's operational mode selecting device from a current state to a changed state;
   during a predetermined period, processing the monitored information according to a predetermined set of rules corresponding to the changed state and also processing the monitored information according to a predetermined set of rules corresponding to the current state;
   determining that the triggering conditions resulted from a change of state of the vehicle's operational mode selecting device; and
   reporting the information processed according to the rules corresponding to the changed state to a remote location.

2. The method of claim 1 further comprising monitoring information from a diagnostic port of the vehicle.

3. The method of claim 1 wherein the current state of the ignition initiating device is 'on' and the changed state is 'off.'

4. The method of claim 3 wherein the rules corresponding to the current state include transmitting the vehicle's location periodically while the vehicle's operational mode selecting device is in the 'on' state.

5. The method of claim 3 wherein the rules corresponding to the changed state include transmitting the vehicle's location once upon the vehicle's operational mode selecting device changing from the 'on' state to the 'off' state.

6. A device configured for performing a method for determining that a user has operated a vehicle's operational mode selecting device, the method comprising:
monitoring information corresponding to an output signal level from an accelerometer of a telematics device coupled to the vehicle;
monitoring information corresponding to a positioning module of the telematics device;
monitoring information corresponding to the vehicle's battery voltage;
determining that monitored information met trigger conditions indicating a potential change of state of the vehicle's operational mode selecting device from a current state to a changed state;
during a predetermined period, processing the monitored information according to a predetermined set of rules corresponding to the changed state and also processing the monitored information according to a predetermined set of rules corresponding to the current state;
determining that the triggering conditions resulted from a change of state of the vehicle's operational mode selecting device; and
reporting the information processed according to the rules corresponding to the changed state to a remote location.

7. The device of claim 6 wherein the method it is configured to perform further comprises monitoring information from a diagnostic port of the vehicle.

8. The device of claim 6 wherein the current state of the ignition initiating device is 'on' and the changed state is 'off.'

9. The method of claim 8 wherein the rules corresponding to the current state include transmitting the vehicle's location periodically while the vehicle's operational mode selecting device is in the 'on' state.

10. The method of claim 8 wherein the rules corresponding to the changed state include transmitting the vehicle's location once upon the vehicle's operational mode selecting device changing from the 'on' state to the 'off' state.

11. A device configured for performing a method for determining that a user has operated a vehicle's operational mode selecting device, comprising:
a processor configured for:
monitoring information corresponding to an output signal level from an accelerometer of a telematics device coupled to the vehicle;
monitoring information corresponding to a positioning module of the telematics device;
monitoring information corresponding to the vehicle's battery voltage;
determining that monitored information met trigger conditions indicating a potential change of state of the vehicle's operational mode selecting device from a current state to a changed state;
during a predetermined period, processing the monitored information according to a predetermined set of rules corresponding to the changed state and also processing the monitored information according to a predetermined set of rules corresponding, to the current state;
determining that the triggering conditions resulted from a change of state of the vehicle's operational mode selecting device; and
reporting the information processed according to the rules corresponding to the changed state to a remote location.

12. The device of claim 11 wherein the method it is configured to perform further comprises monitoring information from a diagnostic port of the vehicle.

13. The device of claim 11 wherein the current state of the ignition initiating device is 'on' and the changed state is 'off.'

14. The method of claim 13 wherein the rules corresponding to the current state include transmitting the vehicle's location periodically while the vehicle's operational mode selecting device is in the 'on' state.

15. The method of claim 13 wherein the rules corresponding to the changed state include transmitting the vehicle's location once upon the vehicle's operational mode selecting device changing from the 'on' state to the 'off' state.

* * * * *